US012003062B2

(12) United States Patent
Büttemeyer et al.

(10) Patent No.: US 12,003,062 B2
(45) Date of Patent: Jun. 4, 2024

(54) PLUG CONNECTOR MODULE FOR MODULAR PLUG CONNECTORS

(71) Applicant: HARTING Electric Stiftung & Co. KG, Espelkamp (DE)

(72) Inventors: Jana Büttemeyer, Rahden (DE); Torsten Wolf, Lübbecke (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 345 days.

(21) Appl. No.: 17/634,691

(22) PCT Filed: Jul. 27, 2020

(86) PCT No.: PCT/DE2020/100670
§ 371 (c)(1),
(2) Date: Feb. 11, 2022

(87) PCT Pub. No.: WO2021/027992
PCT Pub. Date: Feb. 18, 2021

(65) Prior Publication Data

US 2022/0329013 A1 Oct. 13, 2022

(30) Foreign Application Priority Data

Aug. 13, 2019 (DE) ..................... 10 2019 121 801.2

(51) Int. Cl.
*H01R 13/6587* (2011.01)
*H01R 13/518* (2006.01)
(Continued)

(52) U.S. Cl.
CPC ....... *H01R 13/6587* (2013.01); *H01R 13/518* (2013.01); *H01R 13/629* (2013.01); *H01R 13/6582* (2013.01)

(58) Field of Classification Search
CPC .............. H01R 13/6587; H01R 13/518; H01R 13/629; H01R 13/6582; H01R 13/6463; H01R 13/514
See application file for complete search history.

(56) References Cited

U.S. PATENT DOCUMENTS 7,806,729 B2 * 10/2010 Nguyen ............. H01R 13/6585 439/607.23
8,888,533 B2 11/2014 Westman et al.
(Continued)

FOREIGN PATENT DOCUMENTS

CN 103986025 A 8/2014
DE 602006000218 9/2008
(Continued)

*Primary Examiner* — Briggitte R. Hammond
(74) *Attorney, Agent, or Firm* — Smartpat PLC

(57) ABSTRACT

A plug connector module for modular plug connectors produces a connection to a circuit board. The plug connector module includes a housing for receiving at least one insulating element, which is provided for receiving at least one data contact pair. The data contact pair consists of a conductor and a contact element. The housing has at least one recess which is shaped to be engaged with a connection element, whereby the plug connector module is connected to other system-related modules. The plug connector module houses at least two data contact pairs which are provided to transmit data. The data contact pairs are at least substantially secured against interfering influences by a respective shielding element.

7 Claims, 3 Drawing Sheets

(51) Int. Cl.
*H01R 13/629* (2006.01)
*H01R 13/6582* (2011.01)

(56) References Cited

U.S. PATENT DOCUMENTS

| | | | | |
|---|---|---|---|---|
| 9,825,392 | B1 | 11/2017 | Chen | |
| 10,404,006 | B2 * | 9/2019 | Kawahara .............. | H01R 13/64 |
| 2006/0178025 | A1 | 8/2006 | Whiteman et al. | |
| 2009/0203259 | A1 | 8/2009 | Nguyen et al. | |
| 2013/0122744 | A1 | 5/2013 | Morgan et al. | |
| 2014/0220798 | A1 | 8/2014 | Putt, Jr. et al. | |
| 2016/0036165 | A1 | 2/2016 | Phillips et al. | |
| 2019/0207343 | A1 | 9/2019 | Kawahara | |
| 2020/0176918 | A1 | 6/2020 | Wolf | |

FOREIGN PATENT DOCUMENTS

| | | | |
|---|---|---|---|
| DE | 202015105742 | U1 | 11/2015 |
| DE | 102017119287 | A1 | 2/2019 |
| EP | 1098398 | B1 | 1/2007 |
| JP | 2019050176 | B | 8/2021 |

* cited by examiner

PLUG CONNECTOR MODULE FOR MODULAR PLUG CONNECTORS

TECHNICAL FIELD

The disclosure relates to a plug connector module for modular plug connectors.

BACKGROUND

Plug connector modules can be used, on their own or combined with further plug connector modules, to transmit both electrical power and also electrical and/or optical signals/data from a first printed circuit board and/or to the first printed circuit board. Here, this transmission can take place between said first and a second printed circuit board or the first printed circuit board and a plug connector. The modular construction renders possible combination of data-transmitting and/or signal-transmitting and/or power-transmitting plug connector modules in an easy-to-handle and space-saving manner.

DE 10 2017 119 287 A1 discloses a modular plug connector, the modules of which are fixed by means of a connector which is brought into engagement with a dovetail guide. The flexibility achieved in this way renders possible both combination of different plug connector modules and also arrangement of a plurality of identical plug connector modules in a row when putting together plug connectors for circuit boards.

Owing to the modularity of the corresponding plug connectors, it is not unusual for both modules for signal and/or data transmission and also modules for power transmission to be combined in one plug connector. Particularly with the current and rapidly increasing demands by the end user, for example industry and corresponding production installations, in respect of data transmission rates of plug connectors to be used, the combination of data-transmitting modules and power-transmitting modules is accompanied by not inconsiderable challenges.

One particular disadvantage of combining modules which are designed for power transmission and modules which are designed for data transmission that has long been known is that, in respect of data transmission, electromagnetic interference causes disadvantageous influencing of the data transmission rate.

The German Patent and Trademark Office has performed a search of the following prior art in the priority application pertaining to the present application: DE 60 2006 000 218 T2, DE 10 2017 119 287 A1 and US 2016/0036165 A1.

SUMMARY

An object of the disclosure is that of extending an existing plug connector system by a plug connector module which reduces the susceptibility to electromagnetic interference in as simple a manner as possible. In particular, the plug connector module should be able to render possible a data transmission rate of category 6A and thus, in bus systems such as Ethernet, a data transmission rate of greater than or equal to 10 gigabits per second (Gbit/s).

The object is achieved by the subject matter of the independent claim.

Advantageous refinements are specified in the dependent claims and the following description The plug connector module is provided for modular plug connectors, in particular for mounting on a circuit board. The plug connector module has a housing for receiving at least one insulating body. The insulating body receives at least one data contact pair, wherein the data contact pair consists of two conductors and two contact elements. Here, the conductor and the contact element may also be designed in one piece. The housing is designed with at least one recess, wherein the recess is shaped to be brought into engagement with a connecting element. In this way, the plug connector module is connected to further modules of the same system type, as a result of which the plug connector modules are joined together to form a plug connector. Here, the plug connector module receives at least one insulating body for receiving data contact pairs. Furthermore, the plug connector module has at least two data contact pairs which, for their part, are provided to transmit data. The data contact pairs are at least for the most part protected against interfering influences by a respective shielding element. Therefore, not only interfering influences of the data contact pairs amongst one another but also with respect to adjoining modules can be reduced or removed. Despite combination with other modules, in particular power-transmitting modules, a reliable and stable transmission rate can be achieved in this way The term data contact pair means, in particular, two contacts. These two contacts are provided, in particular, for making contact with conductors which establish a conductive connection from the data contact pair to a circuit board. The conductors may be fixed components. Similarly, a conductor may be designed as a cable with at least one core, consisting of at least one stranded wire. Furthermore, a conductive connection of at least one twisted pair to a circuit board can also be provided. Twisted core pairs are preferably used in the field of information technology and are also referred to as a "twisted pair cable".

Here, a plug connector module may be, in particular, part of a modular plug connector which is connected to a circuit board. The plug connector module may likewise be used as part of a plug connector which is attached to a correspondingly designed cable. Furthermore, "part of a plug connector" may mean both the individual plug connector module and likewise "part of a plug connector" may mean the combination comprising the plug connector module with other modules compatible with the system.

The term "module" means further plug connector modules which are connected to the plug connector module. Here, these modules do not necessarily fulfill another purpose. Similarly, modules which fulfill a purpose only in conjunction with other modules may be meant. For example, auxiliary means for simplifying the plug-in process may also be covered by this term.

In a preferred embodiment, the recess in the housing is a groove in the form of a dovetail guide which receives a congruent connecting element at least for the most part in a flush manner. When a corresponding connecting element is used, the simple shape produces secure holding. Plug connector modules of various embodiments can therefore be connected to one another quickly, easily and securely and nevertheless can be simply and precisely inserted as modular plug connectors.

An expedient embodiment makes provision for the recess to be integrally formed on two opposite sides of the module in order to strengthen the connection of the modules by way of the use of two connecting elements. In addition to the clear improvement in stability, simpler mounting of the modular plug connectors can be achieved by way of this embodiment. Owing to approximately axially symmetrical development of individual plug connector modules, the plug connector modules can be particularly simply put together to form a plug connector since the orientation of the plug connector modules does not first have to be taken into account during manufacture.

A further advantageous embodiment recommends arranging the at least two data contact pairs in the housing along a plane of the plug connector module angled in relation to a vertical plane, formed by a line parallel to the longitudinal axis and a vertical line arranged approximately in the middle between a data contact pair. This means that, with respect to a front view, the data contact pairs are positioned along a straight line which is oriented at an angle in relation to a vertical (center) axis. In other words, the data contact pairs are not oriented in a flush manner in relation to one another. Therefore, the performance of the data contact pairs is additionally increased since electromagnetic interference of the data contact pairs amongst one another is reduced beyond the effect of the shielding element.

In a further embodiment, the data contact pairs, in a front view, are arranged to be symmetrical, in particular point-symmetrical, with respect to the center point of the housing. In this way, data contact pairs used are arranged offset in relation to one another. The performance of the data contact pairs is thus additionally increased since electromagnetic interference of the data contact pairs amongst one another is reduced beyond the effect of the shielding element.

One embodiment is distinguished in that the individual shielding elements of the data contact pairs surround both the data contact pairs and also the associated conductor pair along their longitudinal axis at least over a length which corresponds to the length of a contact and an insulating body receiving the contact. In particular, this means 360° shielding of the respective data contact pairs. Here, 360° shielding means that, in a front view, a shielding element is shaped in such a way that a data contact pair is completely surrounded. Furthermore, this complete shielding should be performed over at least the length which a pair of conductors, associated with the data contact pair, covers from the insulating body of the plug connector module to the circuit board. When a (twisted) core pair is used, the shielding element should assume at least the length which is required in order to maintain the shielding from the contact until transfer to a shielding element made in the cable.

An apt embodiment makes provision for the shielding elements to shield the data contact pairs all the way around in such a way that, when a suitable conductor is used, a data transmission rate of greater than or equal to 10 gigabits per second (Gbit/s) is achieved. Data transmission rates of this kind are classified, or categorized, by standard. The category for the transmission capacity of at least 10 Gbit/s falls into category 6A (Cat-6A) or correspondingly higher according to this standard. In order to set up a contemporary network for digital data processing, both plug connectors and also conductors, such as cables, circuit boards (that is to say printed circuit boards) or the like are therefore expediently selected in accordance with their data transmission category.

BRIEF DESCRIPTION OF THE DRAWINGS

An exemplary embodiment is illustrated in the drawings and will be explained in more detail below.

DETAILED DESCRIPTION

The figures contain partly simplified, schematic illustrations. In some cases, identical reference signs are used for elements which are similar but may not be identical. Different views of the same elements may be drawn to different scales. Directional indications such as "left", "right", "above" and "below" are to be understood with reference to the figure in question and may vary in the individual illustrations in relation to the illustrated object.

The figures contain reference signs which additionally have further numberings with indices such as "'" or are separated by a period, for example "10.*x*", where natural numbers of ascending order are used for "x". This indicates that the elements in question are, in principle, elements mentioned in the list of reference signs which can be shaped differently to the elements without a reference sign index or may differ from the differently numbered elements in form and/or function.

Figure 1:
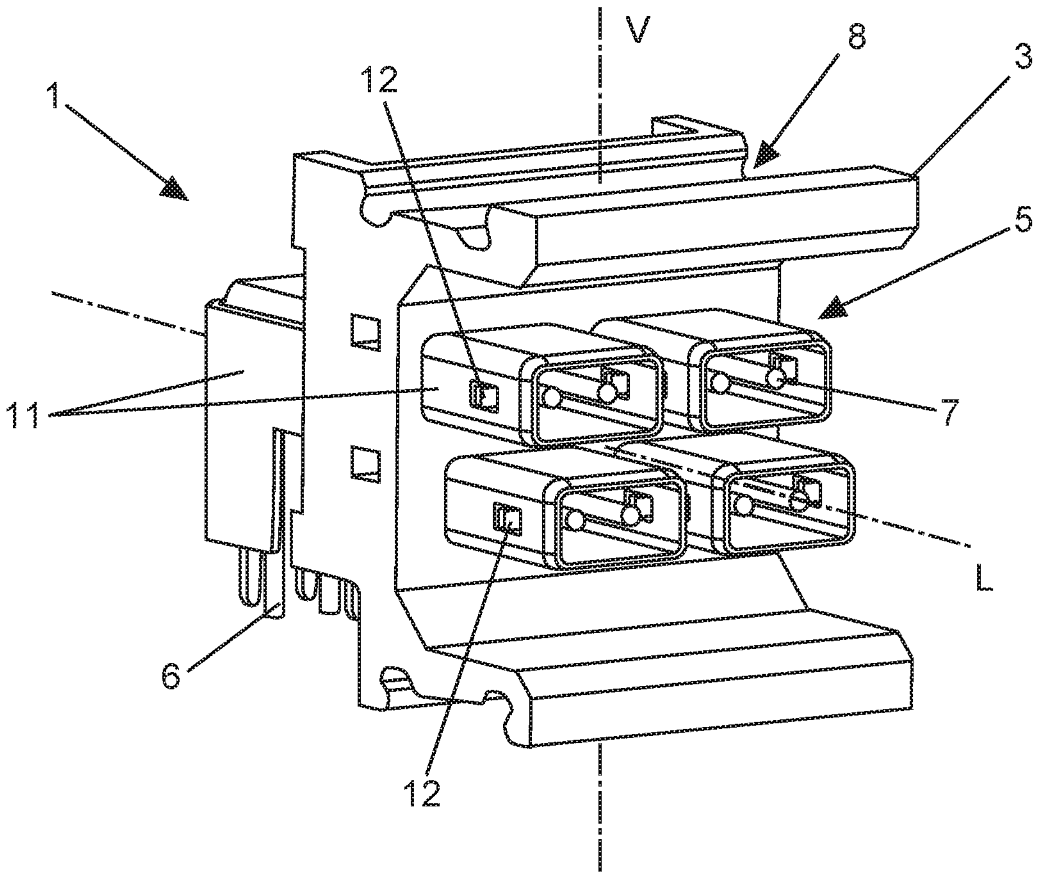
FIG. 1 shows a perspective illustration of a plug connector module.

FIG. 1 shows a perspective illustration of a plug connector module 1. The housing 3 has recesses 8 on opposite faces. Said recesses render possible connection of the plug connector module 1 to a further module belonging to the system. It can be immediately seen from the illustration that the data contact pairs 5 guided through the housing 3 are at different distances from a longitudinal axis L and from a vertical line V running through the longitudinal axis L. In this illustration, the plug connector module 1 has a housing 3 which receives four identical data contact pairs 5. The contacts 7 of the data contact pairs 5 are designed as pin contacts and, in accordance with the designation, are surrounded by a shielding element 11 in pairs. Furthermore, the dimensioning of the shielding element 11 is clearer. The respective, associated shielding element 11 extends from the plug-in side of the contacts 7 of the data contact pairs 5 along a conductor 6 which is connected, for example, to a circuit board (not illustrated). Furthermore, convex portions can be seen on the shielding elements 11, said convex portions being integrally formed approximately in the middle between the contacts 7 of the data contact pairs 5. These convex portions ensure the transfer of the shielding when the plug connector module is in the state plug-connected to a congruent plug connector module 1'. Consequently, these convex portions are referred to as shielding contacts 12.

Figure 2:
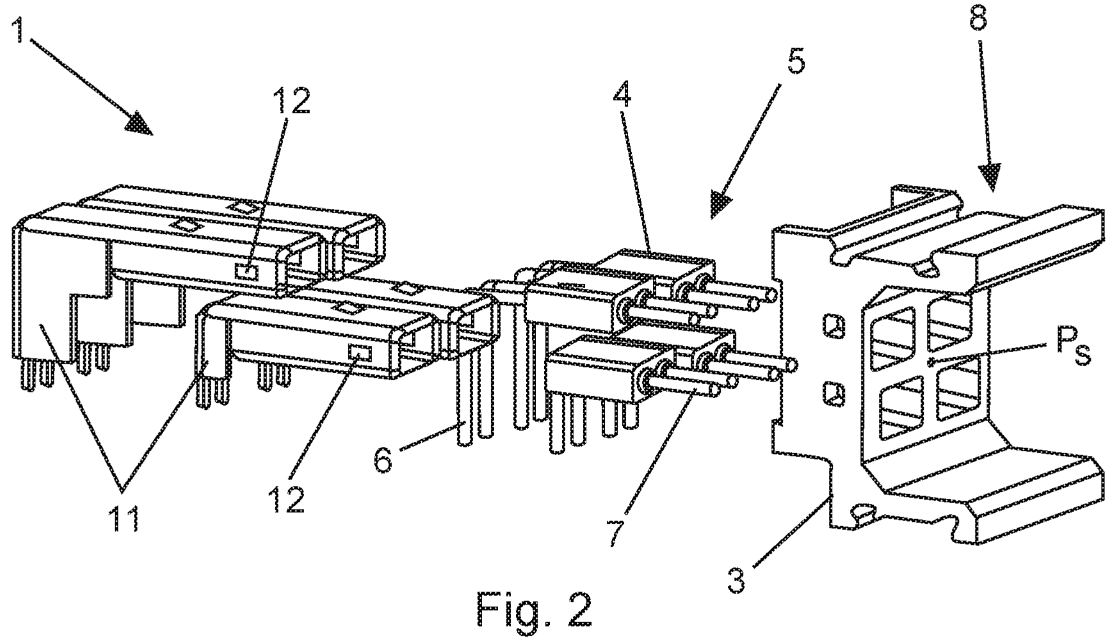
FIG. 2 shows a perspective illustration of a plug connector module in the style of an exploded diagram.

The design of a plug connector module 1 is clear from FIG. 2. The shape of the shielding elements 11 is particularly clear from this exploded drawing. Furthermore, besides the housing 3, the insulating bodies 4 are shown. The insulating bodies 4 receive the contacts 7, illustrated as pin contacts, of the data contact pairs 5 and secure said contacts in their position. The shielding elements 11 are shaped such that they receive the insulating bodies 4 and completely surround the data contact pairs 5. Particularly advantageous shielding is achieved in this way. In order to securely transfer the advantageous shielding to an inversely shaped plug connector module 1' and its shielding element 11', the embodiment provides shielding contacts 12. The advantageous point-symmetrical arrangement of the data contact pairs 5 of the illustrated embodiment can also be seen in FIG. 2. The two upper data contact pairs 5 can rotate through 180° at the point Ps, so that the lower two data contact pairs 5 are displayed. This offset arrangement leads to interference between the data contact pairs 5 being reduced. This already reduced interference can be almost completely limited owing to the use of the shielding elements 11. A data transmission rate of greater than or equal to 10 Gbit/s is achieved by way of combining these interference-reducing design features.

Figure 3:
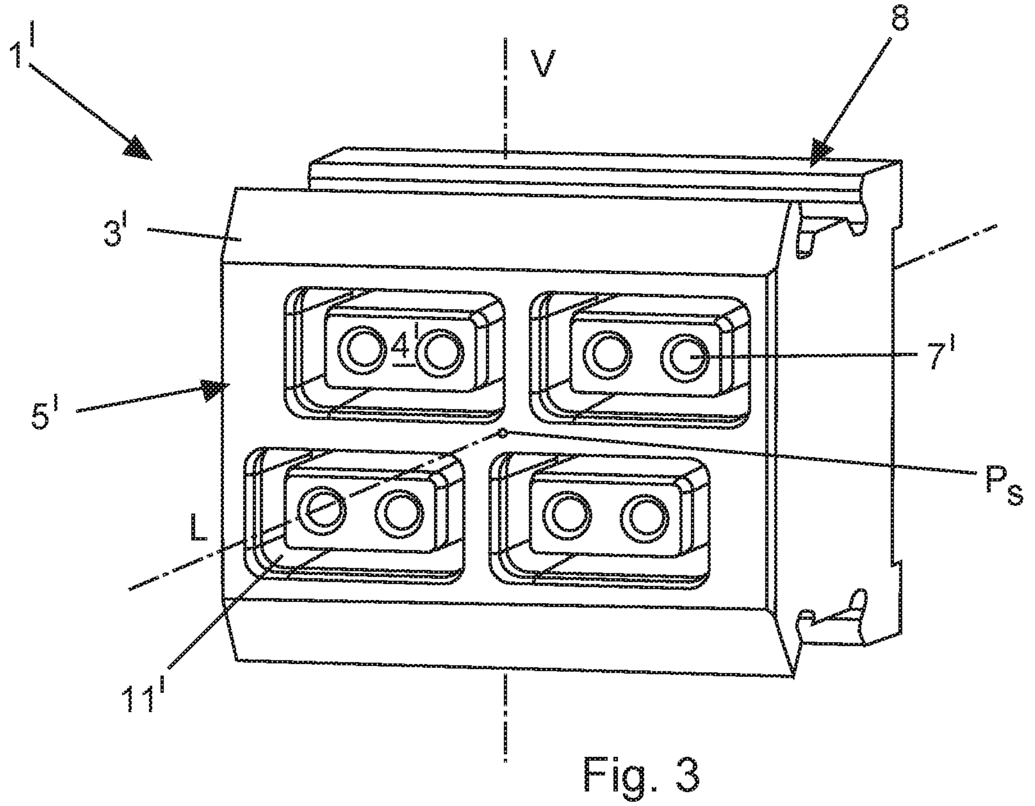
FIG. 3 shows a perspective illustration of a plug connector module, designed as a mating piece to FIG. 1.

FIG. 3 shows a plug connector module 1' in the form of a mating plug for the embodiment illustrated in FIGS. 1 and 2. The housing 3' is shaped in such a way that it can be inserted into the housing 3. Similarly, the contacts 7' are designed as sockets and receive the contacts 7 and in this way establish an electrically conductive connection. The insulating bodies 4' receive the contacts 7', designed as sockets, of the data contact pairs 5' and, for their part, are each surrounded by a shielding element 11'. The plug connector module 1' also has two recesses 8 which render possible connection to further components owing to the use of a connecting element.

Figure 4:
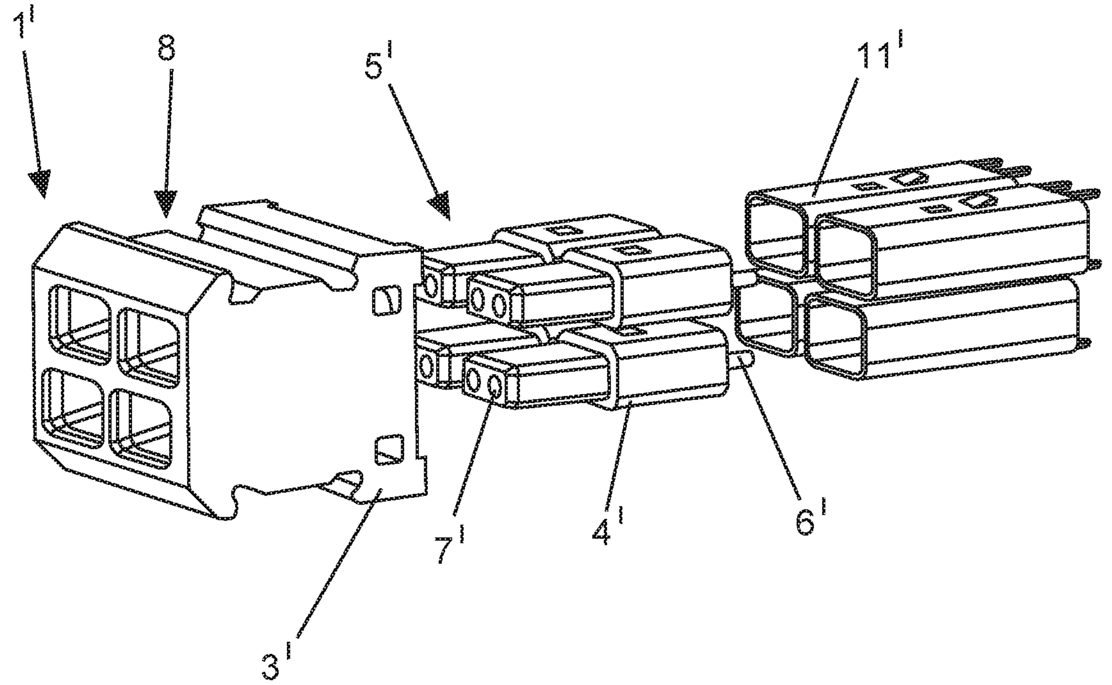
FIG. 4 shows a perspective illustration of a plug connector module in the style of an exploded diagram, designed as a mating piece to FIG. 2.

FIG. 4 shows an exploded illustration of a plug connector module 1' described in FIG. 3. This illustration shows the shape of the shielding elements 11' which are inserted into the housing 3' and also surround and therefore shield the conductors 6' over the length of the insulating bodies 4'.

Figure 5:
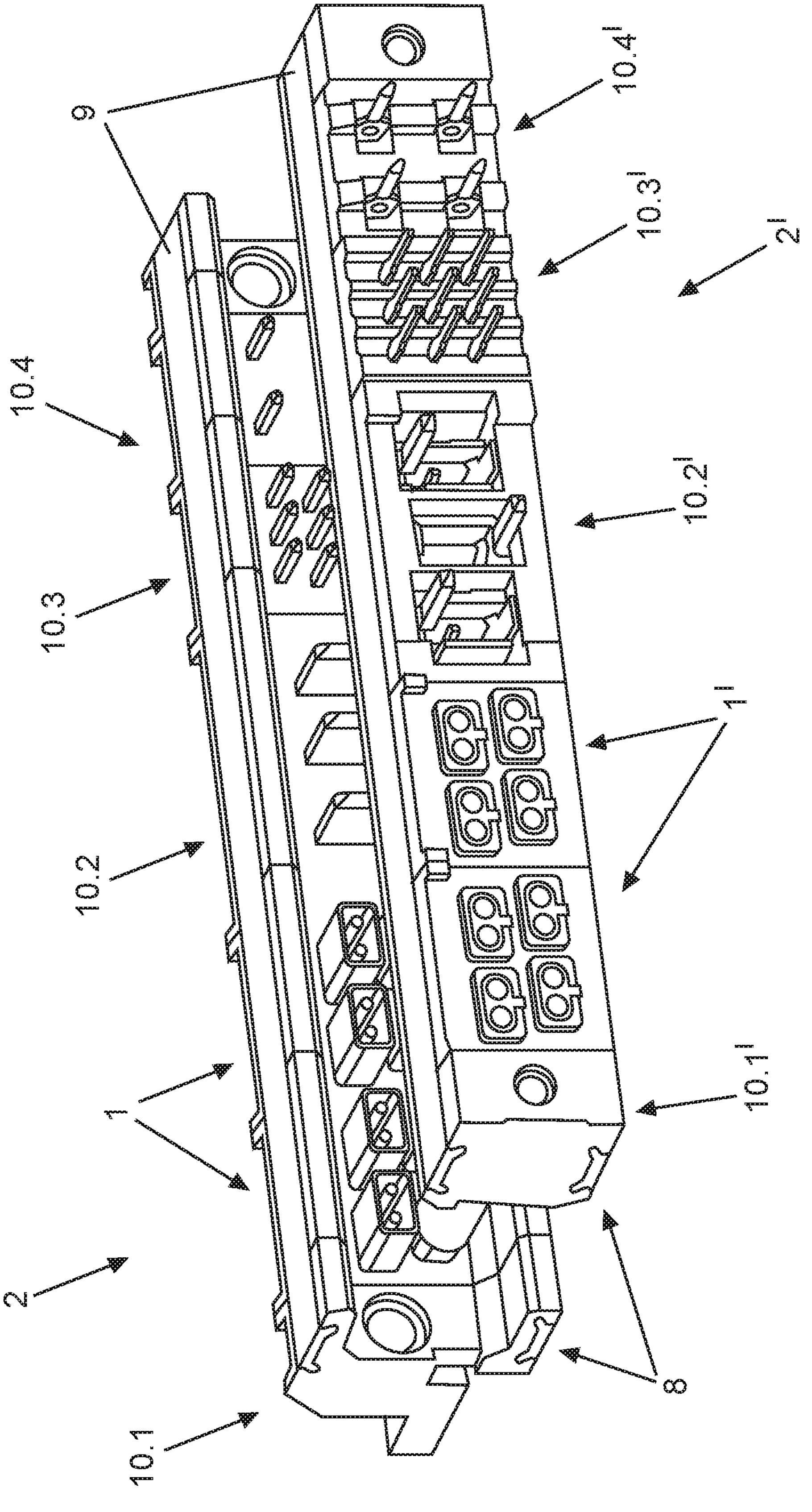
FIG. 5 shows two congruent modular plug connectors with plug connector modules together with further components.

One possible feasible use of the plug connector modules 1 and 1' can be seen in FIG. 5. Said figure shows two plug connectors 2 and 2' which are shaped in such a way that they can be brought into engagement with one another. Here, the plug connector module 1 is connected, by way of connecting elements 9 inserted through the recesses 8 and therein, to other modules 10.1, 10.2, 10.3 and 10.4 of the same system and form the plug connector 2. The same applies to the modules 10.1', 10.2', 10.3' and 10.4' of the opposite plug connector 2' and the plug connector module 1' which are fixed to one another by way of two connecting elements 9 which are inserted into the recesses 8. The plug connectors 2 and 2' contain the modules 10.1 and 10.1' which provide for correct and secure fitting of the plug connection. The modules 10.2 and 10.2' transmit electrical power. The modules 10.3 and 10.3' are modules for signal transmission and the modules 10.4 and 10.4' transmit electrical power which is, in principle, lower than the power of the power transmitted by the modules 10.2 and 10.2'. It is obvious from the illustrated design that the plug connector module 1 and its corresponding design 1' can be used both besides identical modules and also besides modules of the same system, in this case the modules 10.2 and 10.2'. The embodiments shown are provided primarily for what is known as "board-to-board" design. That is to say, the plug connectors 2 and 2' are designed to establish a connection from one circuit board to a further circuit board. It is of course also feasible to use this technology in what is known as a "cable-to-board" solution. In other words, the illustrated plug connectors 2 and 2' and corresponding, modified embodiments can also be used for connection of a cable to a circuit board.

Even though various aspects or features of the invention are shown respectively in combination in the figures, it is clear to a person skilled in the art—unless stated otherwise—that the illustrated and discussed combinations are not the only ones possible. In particular, mutually corresponding units or feature complexes from different exemplary embodiments can be exchanged with one another.

LIST OF REFERENCE SIGNS

1 Plug connector module
2 Modular plug connector
3 Housing
4 Insulating body
5 Data contact pair
6 Conductor
7 Contact element
8 Recess
9 Connecting element
10.*x* (System-related) module
11 Shielding element
12 Shielding contact
L Longitudinal axis
V Vertical line
PS Point of symmetry

The invention claimed is:

1. A plug connector module (1) for modular plug connectors (2) for establishing a connection to a circuit board, comprising:
a housing (3);
a recess (8) formed in the housing (3) and shaped to be brought into engagement with a connecting element (9) to connect the plug connector module (1) to related modules (10.*x*);
two or more insulating bodies (4) received in the housing;
at least two data contact pairs (5), one data contact pair being received within each of the insulating bodies (4) and comprising
two conductors (6) and
two contact elements (7) for transmitting data; and
a shielding element (11) arranged around each of the at least two data contact pairs (5) to protect the at least two data contact pairs (5) against interfering influences.

2. The plug connector module (1) as claimed in claim 1, wherein the recess (8) is a groove in the form of a dovetail guide, and
wherein the connecting element (9) is a congruent dovetail element seated flush within the dovetail guide.

3. The plug connector module (1) as claimed in claim 1, further comprising:
a further recess, the recess (8) and the further recess being integrally formed on opposite sides of the plug connector module (1),
wherein the further recess (8) is shaped to be brought into engagement with a further connecting element (9) to connect the plug connector module (1) to the related modules (10.*x*).

4. The plug connector module (1) as claimed in claim 1, wherein the at least two data contact pairs (5) are arranged in the housing (3) along a plane of the plug connector module (1) angled in relation to a vertical plane, formed by a line parallel to a longitudinal axis (L) and a vertical line (V) arranged approximately in the middle between a data contact pair (5).

5. The plug connector module (1) as claimed in claim 1, wherein the at least two data contact pairs (5), in a front view, are arranged to be point-symmetrical with respect to a point of symmetry (PS) of the housing (3).

6. The plug connector module (1) as claimed in claim 1, wherein the shielding elements (11) shield the data contact pairs (5) all the way around in such a way that, when a suitable conductor (6) is used, a data transmission rate of greater than or equal to 10 gigabits per second is achieved.

7. The plug connector module (1) as claimed in claim 1, wherein the shielding elements (11) of the data contact pairs (5) surround both the data contact pairs (5) and also the associated conductor pair (6) along their longitudinal axis at least over a length which corresponds to the length of a contact (7) and an insulating body (4) receiving this contact (7).

* * * * *